P. Wilson,
Cheese Press.
N° 79,286. Patented June 23, 1868.

Witnesses:
W. C. Collins
T. H. Kimball

Inventor:
P. Wilson
by his attorney
R. M. Mason

United States Patent Office.

PUTNAM WILSON, OF NEWPORT, ASSIGNOR TO R. M. MANSUR, OF AUGUSTA, MAINE.

Letters Patent No. 79,286, dated June 23, 1868.

IMPROVED CHEESE-PRESS.

*The Schedule referred to in these Letters Patent and making part of the same.*

TO ALL WHOM IT MAY CONCERN:

Be it known that I, PUTNAM WILSON, of Newport, in the county of Penobscot, and State of Maine, have invented a new and useful "Improvement in Cheese, Wine, and Cider-Presses;" and I do hereby declare that the following is a full and exact description of the construction and mode of using the same, reference being had to the accompanying drawings, and to the letters and figures marked thereon.

Figure 1:
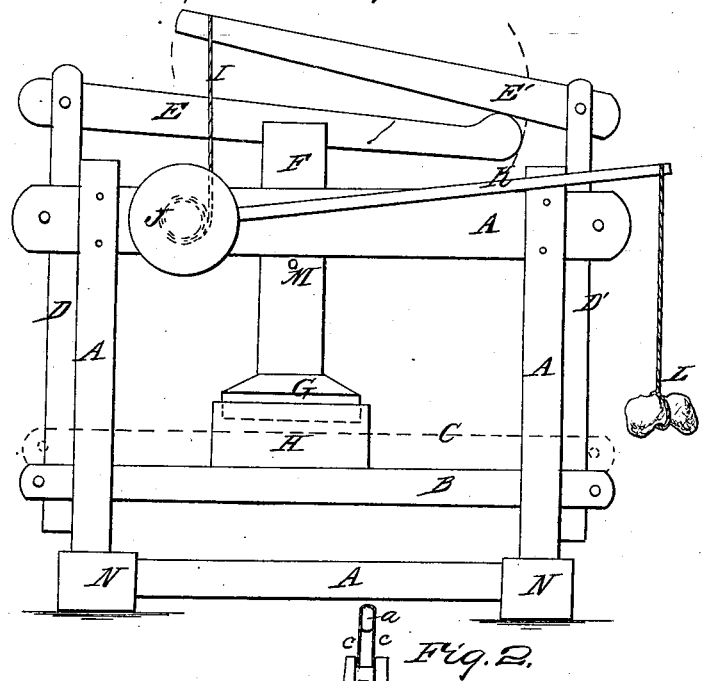
Figure 1 is a front side view of the "press," showing the improvements claimed.

Fig. 1. My improvement consists in the double-lever purchase, whereby the "cheese" is more evenly pressed and with less strength or force being used than in common presses; also that the bed-piece or bottom upon which the "cheese" rests is made so as to be raised or pressed upwards, by the force exerted upon the levers by the help of the wheel and axle, as communicated to the same by the loose end-pieces or bars, whereby there is an upward pressure as well as downward. This improved press may be used to advantage in pressing plums or fruit of any kind for wine or vinegar, and for a domestic cider-press, as well as several other uses where a cheap portable press is required, but in this specification its description is confined to its use in pressing cheese, which illustrates the main and leading features of the invention.

In fig. 1, the solid frame A A A A is represented with its second or loose bottom B, which can be pressed upward as shown by the dotted line C, the power being communicated to it by the loose end-pieces or bars D D, to the upper ends of which are fastened the "double levers" E E, the middle of the lower lever resting upon the upright standard F, which passes loosely through the upper part of the frame A, resting upon the "follower" G upon the cheese in the hoop H. A cord, I, is fastened to the end of the upper lever, and passing down is wound around the small axle, as shown by the drum J, which is turned by a hard-wood lever, K, which is about three feet in length, the heft of which is about enough, by the power obtained, to press an ordinary cheese at first, but towards the last of the pressing, a weight, as L, of some kind is needed, which may be as shown, or consist of a small bail-basket or bag, with a weight in the same. The hole in the standard or upright at M is to be brought above the upper part of the frame A, and a pin put in it to hold the same up out of the way while the cheese is being adjusted in the press.

Figure 2:
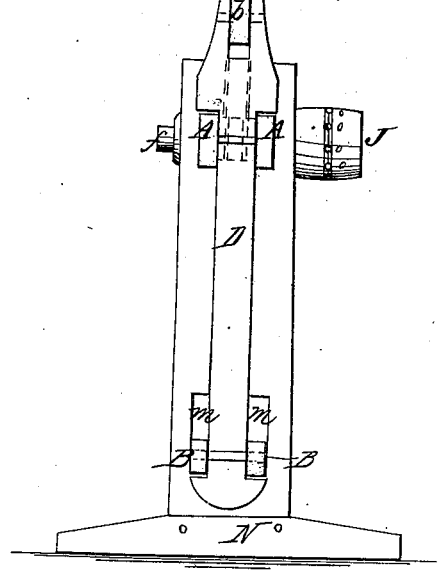
Figure 2 is an end view of the same.

Fig. 2 is an end view of the press, more fully showing the construction of some parts of the press, and the working of the same, *a* representing the end of the upper lever, *b* the end of the lower lever, *c c* the cord, attached to the end of the upper lever and around the axle *f*; D the loose end-piece, passing loosely between the upper part of the frame A, the lower part being made fast and solid to the loose bottom B, which is raised up in the slots *m m* as the ends of the levers are depressed. N is the foot-piece of the frame of the press, to keep the same upright in place. *o o o* are holes in the hub J, in which to put the lever, as represented by K in fig. 1.

In operating this press, three lever-powers are used, as shown in fig. 1. The standard, resting upon the top of the cheese, is the fulcrum of the lower lever E, the left-hand end of the loose bottom of the press B being the weight to be raised, the power being the fulcrum of the upper lever, the other end of B being raised, the power being another lever-power, as shown, drum J and lever K, the combined force, as communicated by the different powers, giving an upward pressure as well as downward.

What I claim, and desire to secure by Letters Patent, is—

The construction and arrangement of the levers E E, uprights D D, movable bottom B, upright standard F, and followers G, all operated by the rope I, drum J, and lever K, substantially as herein set forth.

PUTNAM WILSON. [L. S.]

Witnesses:
PHILIP WILSON,
A. J. CLIFFORD.